United States Patent
Mitsuoka et al.

(10) Patent No.: US 11,254,824 B2
(45) Date of Patent: Feb. 22, 2022

(54) SOLVENT COMPOSITION, CLEANING METHOD, METHOD FOR PRODUCING SUBSTRATE WITH COATING FILM, AND HEAT TRANSFER FLUID

(71) Applicant: AGC Inc., Chiyoda-ku (JP)

(72) Inventors: Hiroaki Mitsuoka, Chiyoda-ku (JP); Toshio Miki, Chiyoda-ku (JP); Tsuyoshi Hanada, Chiyoda-ku (JP); Mari Ichinokawa, Chiyoda-ku (JP); Atsushi Fujimori, Chiyoda-ku (JP); Hidekazu Okamoto, Chiyoda-ku (JP)

(73) Assignee: AGC Inc., Chiyoda-ku (JP)

( * ) Notice: Subject to any disclaimer, the term of this patent is extended or adjusted under 35 U.S.C. 154(b) by 0 days.

(21) Appl. No.: 16/797,237

(22) Filed: Feb. 21, 2020

(65) Prior Publication Data
US 2020/0190341 A1    Jun. 18, 2020

Related U.S. Application Data

(63) Continuation of application No. PCT/JP2018/031035, filed on Aug. 22, 2018.

(30) Foreign Application Priority Data

Aug. 25, 2017 (JP) .............................. JP2017-162492

(51) Int. Cl.
| | |
|---|---|
| *C09K 5/04* | (2006.01) |
| *C09D 5/16* | (2006.01) |
| *C09D 7/20* | (2018.01) |
| *B05D 3/02* | (2006.01) |
| *B08B 3/08* | (2006.01) |
| *C11D 7/50* | (2006.01) |

(52) U.S. Cl.
CPC ......... *C09D 5/1687* (2013.01); *B05D 3/0254* (2013.01); *B08B 3/08* (2013.01); *C09D 7/20* (2018.01); *C09K 5/044* (2013.01); *C09K 5/048* (2013.01); *C11D 7/5018* (2013.01); *C09K 2205/126* (2013.01); *C09K 2205/24* (2013.01)

(58) Field of Classification Search
CPC ......... C09D 5/1687; C09D 7/20; C09D 7/40; C09D 201/00; B05D 3/0254; C09K 5/044; C09K 5/048; C09K 2205/126; C09K 2205/24; C09K 5/04; C11D 7/5018; C11D 7/24; C11D 7/26; C11D 7/30; C11D 7/50

USPC ......... 252/67, 68, 69, 364; 427/445; 134/34; 510/412
See application file for complete search history.

(56) References Cited

U.S. PATENT DOCUMENTS

| | | | |
|---|---|---|---|
| 7,985,299 B2 | 7/2011 | Johnson et al. | |
| 8,418,530 B1* | 4/2013 | Scaringe | G01M 3/228 73/40.7 |
| 2007/0102021 A1 | 5/2007 | Nappa et al. | |
| 2007/0105738 A1* | 5/2007 | Nappa | G11B 23/505 510/245 |
| 2018/0127341 A1 | 5/2018 | Nakamura et al. | |
| 2020/0224822 A1* | 7/2020 | Chinsoga | C07C 21/185 |

FOREIGN PATENT DOCUMENTS

| | | |
|---|---|---|
| JP | 2-221388 A | 9/1990 |
| JP | 11-293285 A | 10/1999 |
| JP | 2009-513348 A | 4/2009 |
| JP | 2013-224383 A | 10/2013 |
| JP | 2016-169256 A | 9/2016 |
| WO | WO 2013/161723 A1 | 10/2013 |
| WO | WO 2017/122803 A1 | 7/2017 |
| WO | WO-2019230842 A1 * | 12/2019 ........... C07C 17/383 |

OTHER PUBLICATIONS

CAS reg. No. 509088-51-1, May 2, 2003 (Year: 2003).*
Morrison and Boyd, Organic Chemistry, Allyn and Bacon, Inc., 3rd ed., p. 86, 1973. (Year: 1973).*
E-Z Notation for Geometric Isomerism, Jim Clark, 10 pages, Nov. 2012. (Year: 2012).*
Zapevalov et al., Russian Journal of Organic Chemistry, 24, 1466-1472, 1988. (Year: 1988).*
International Search Report dated Oct. 2, 2018 in PCT/JP2018/031035 filed Aug. 22, 2018, 1 page.

* cited by examiner

*Primary Examiner* — Douglas J McGinty
(74) *Attorney, Agent, or Firm* — Oblon, McClelland, Maier & Neustadt, L.L.P.

(57) ABSTRACT

To provide a solvent composition in which various organic substances are soluble, and which has no adverse effect on global environment. A solvent composition comprising 1-chloro-2,3,3,4,4,5,5-heptafluoro-1-pentene, a cleaning method using the solvent composition, a method for producing a substrate with a coating film, and a heat transfer fluid.

20 Claims, No Drawings

SOLVENT COMPOSITION, CLEANING METHOD, METHOD FOR PRODUCING SUBSTRATE WITH COATING FILM, AND HEAT TRANSFER FLUID

TECHNICAL FIELD

The present invention relates to a solvent composition which has no adverse effect on global environment and in which various organic substances are soluble. The present invention further relates to a cleaning method using the solvent composition, a method for producing a substrate with a coating film, and a heat transfer fluid.

BACKGROUND ART

In manufacture of IC, an electronic component, a precision machinery component, an optical component, etc., in a manufacturing process, an assembly process, a final finishing process, etc., components are cleaned by a cleaning agent, thereby removing flux, a processing oil, wax, a release agent, dust, etc. adhering to the components. Further, as a method for producing a substrate with a coating film, having a coating film containing various organic chemical substances such as a lubricant, for example, there is known a method in which a solution having the organic chemical substances dissolved in a coating solvent is prepared, the solution is applied on a substrate, and thereafter the coating solvent is evaporated to form a coating film. The coating solvent is required to allow the organic chemical substances to be dissolved sufficiently and to have a sufficient drying property as well.

As a solvent to be used in such uses, there has been used a fluorinated solvent or the like containing a chlorofluorocarbon (hereinafter referred to as "CFC") such as 1,1,2-trichloro-1,2,2-trifluoroethane, a hydrochlorofluorocarbon (hereinafter referred to as "HCFC") such as 2,2-dichloro-1,1,1-trifluoroethane, 1,1-dichloro-1-fluoroethane, 3,3-dichloro-1,1,1,2,2-pentafluoropropane or 1,3-dichloro-1,1,2,2,3-pentafluoropropane, or the like, in that it has incombustibility and low toxicity, is excellent in stability, does not erode a substrate of metal, resin, elastomer, or the like, and is excellent in chemical and thermal stability.

However, because the CFCs are chemically very stable, they have a long lifetime in the troposphere after vaporization, and diffuse and reach the stratosphere. Therefore, there is a problem that the CFCs which have reached the stratosphere are decomposed by ultraviolet rays and generate chlorine radicals to deplete the ozone layer. Accordingly, production of the CFCs is regulated globally, and their production in advanced countries has been totally abolished.

Further, HCFCs also have chlorine atoms and have an adverse effect slightly on the ozone layer, and thus their production in advanced countries is to be totally abolished in 2020.

On the other hand, as a solvent having no chlorine atom and thereby having no adverse effect on the ozone layer, a perfluorocarbon (hereinafter referred to as "PFC") is known. In addition, as an alternative solvent to the CFCs and the HCFCs, a hydrofluorocarbon (hereinafter referred to as "HFC"), a hydrofluoroether (hereinafter referred to as "HFE"), and the like are also under development.

However, because the HFCs and the PFCs are substances subject to regulation by the Kyoto Protocol, to prevent global warming.

As a new solvent which replaces the solvents such as the HFCs, the HFEs and the PFCs, a chlorofluoroolefin (CFO) and a hydrochlorofluoroolefin (HCFO) having a double bond between carbon atoms are proposed. Because such CFOs and HCFOs are easily decomposed and thereby have a short lifetime in the atmosphere and its ozone depletion potential and global warming potential are low, they have an excellent property such as little effect on global environment.

As such CFOs, 1,1-dichloro-2,3,3,33-tetrafluoro-1-propene (CFO-1214ya) is used as a solvent composition for cleaning or a coating solvent of a lubricant (for example, Patent Documents 1 and 2).

As the HCFOs, 1,1-dichloro-3,3,3-trifluoro-1-propene (HCFO-1223za) is used as a coating solvent of a lubricant or a degreasing cleaning agent (for example, Patent Documents 3 and 4). Further, 1-chloro-3,3,3-trifluoro-1-propene (HCFO-1233zd) is used as a cleaning agent (for example, Patent Document 5).

With respect to the boiling point of the above-described compounds, CFO-1214ya has a boiling point of about 46° C., HCFO-1223za about 54° C., HCFO-1233zd(E) about 19° C., and HCFO-1233zd(Z) about 40° C., and all these compounds have a low boiling point of at most 60° C.

Components of a cleaning agent, a coating solvent and a heat transfer fluid, are selected considering solubility with other components used in combination, the boiling point of the compound, etc. depending upon use conditions. Accordingly, in order for application in a wider range, a solvent in which various organic substances are soluble and which has no adverse effect on global environment, and has a boiling point higher than those of the above-described CFO-1214ya, HCFO-1223za, HCFO-1233zd, etc. has been desired.

PRIOR ART DOCUMENTS

Patent Documents

Patent Document 1: JP-A-2013-224383
Patent Document 2: WO2013/161723
Patent Document 3: JP-A-2016-169256
Patent Document 4: JP-A-H02-221388
Patent Document 5: U.S. Pat. No. 7,985,299

DISCLOSURE OF INVENTION

Technical Problem

It is an object of the present invention to provide a solvent composition which has no adverse effect on global environment and in which various organic substances are soluble, a cleaning method using the solvent composition, a method for producing a substrate with a coating film using the solvent composition as a coating solvent, and a heat transfer fluid containing the solvent composition.

Solution to Problem

Under these circumstances, the present inventors have conducted extensive studies and accomplished the present invention. That is, the present invention provides the following.

[1] A solvent composition comprising 1-chloro-2,3,3,4,4,5,5-heptafluoro-1-pentene.

[2] The solvent composition according to [1], wherein the proportion of the content of 1-chloro-2,3,3,4,4,5,5-heptafluoro-1-pentene to the total amount of the solvent composition is at least 50 mass %.

[3] The solvent composition according to [1] or [2], wherein in the 1-chloro-2,3,3,4,4,5,5-heptafluoro-1-pentene, the proportion of the content of (Z)-1-chloro-2,3,3,4,4,5,5-heptafluoro-1-pentene to the total amount of (Z)-1-chloro-2,3,3,4,4,5,5-heptafluoro-1-pentene and (E)-1-chloro-2,3,3,4,4,5,5-heptafluoro-1-pentene is at least 50 mass %.

[4] The solvent composition according to any one of [1] to [3], which further contains a solvent soluble in 1-chloro-2,3,3,4,4,5,5-heptafluoro-1-pentene.

[5] The solvent composition according to any one of [1] to [4], which contains, as a solvent soluble in 1-chloro-2,3,3,4,4,5,5-heptafluoro-1-pentene, at least one member selected from the group consisting of isopropanol, 1-butanol, 2-methyl-1-propanol, 2,2,4-trimethylpentane, cyclohexane, methyl ethyl ketone, methyl isobutyl ketone, propylene glycol methyl ethyl acetate, ethyl acetate, trans-1,2-dichloroethylene, 1-chloro-2,3,3-trifluoro-1-propene, 1-chloro-3,3,3-trifluoro-1-propene and 1,3-dichloro-2,3,3-trifluoro-1-propene.

[6] The solvent composition according to any one of [1] to [5], which further contains a stabilizer.

[7] The solvent composition according to [6], wherein the stabilizer has a boiling point of from 80 to 120° C.

[8] A cleaning method, which comprises bringing the solvent composition as defined in any one of [1] to [7] and an article to be cleaned into contact with each other.

[9] A method for producing a substrate with a coating film, which comprises dissolving a nonvolatile substance in the solvent composition as defined in any one of [1] to [7] to obtain a coating film-forming composition, applying the coating film-forming composition to a substrate, and evaporating the solvent composition to form a coating film containing the nonvolatile substance as the main component.

[10] The method for producing a substrate with a coating film according to [9], wherein the nonvolatile substance is at least one member selected from a lubricant, an anticorrosive agent and a surface treatment agent.

[11] A heat transfer fluid, comprising the solvent composition as defined in any one of [1] to [7].

In this specification, unless otherwise specified, a saturated HFC will be referred to as a HFC and is distinguished from a HFO. Further, a HFC may be described as a saturated hydrofluorocarbon in some cases. Further, in this specification, abbreviated names of halogenated hydrocarbon compounds are described in brackets after the compound names, and the abbreviated names are employed instead of the compound names as the case requires. Further, as abbreviated names, only numerals and small alphabet letters after a hyphen may be used.

Further, with respect to a compound which has a double bond in its molecule and of which E- and Z-geometric isomers are present, an E-form and a Z-form are denoted by (E) and (Z) before the compound name or after the abbreviated name. A compound not denoted by (E) or (Z) means an E-form, a Z-form or a mixture of an E-form and a Z-form in an optional proportion.

Advantageous Effects of Invention

The solvent composition of the present invention has no adverse effect on global environment, and various organic substances are soluble in it.

The cleaning method of the present invention has no adverse effect on global environment and is excellent in detergency.

The method for producing a substrate with a coating film of the present invention has no adverse effect on global environment and allows a uniform coating film to be formed.

The heat transfer fluid containing the solvent composition of the present invention has no adverse effect on global environment and is excellent in heat cycle performance.

DESCRIPTION OF EMBODIMENTS

<Solvent Composition>

The solvent composition according to the present embodiment comprises 1-chloro-2,3,3,4,4,5,5-heptafluoro-1-pentene (CHCl=CFCF$_2$CF$_2$CF$_2$H; HCFO-1437dycc, hereinafter referred to as "1437dycc"). The solvent composition according to the present embodiment may consist solely of 1437dycc. The solvent composition according to the present embodiment may contain, in addition to 1437dycc, a solvent soluble in 1437dycc (hereinafter referred to as "solvent (A)") or other component which stabilizes 1437dycc, such as a stabilizer. Further, the solvent composition according to the present embodiment may contain, in addition to 1437dycc, impurities such as a by-product formed in the process for producing 1437dycc. Now, the solvent composition according to an embodiment of the present invention will be described.

(1437dycc)

1437dycc has a short life in the air and has a low ozone depletion coefficient and a low global warming potential, since it has a double bond between carbon atoms and the bond is easily decomposed by OH radicals in the air. 1437dycc has Z-form (hereinafter referred to as "1437dycc(Z)") and E-form (hereinafter referred to as "1437dycc(E)") structural isomers. In the present invention, 1437dycc may be any of 1437dycc(Z), 1437dycc(E) and a mixture of 1437dycc(Z) and 1437dycc(E). As 1437dycc, 1437dycc(Z) is easily available.

1437dycc(Z) has a boiling point of about 89° C. and is excellent in volatility as compared with 1437dycc(E). Further, even when it is let boil and vaporize, its temperature is about 89° C., and accordingly it is less likely to impair components vulnerable to heat, such as resin members. Further, 1437dycc has no flash point, has low surface tension and low viscosity and is excellent in permeability, and thereby has excellent performance as a cleaning agent or a coating solvent.

In the solvent composition according to the present embodiment, the proportion of the content of 1437dycc(Z) to the total amount of 1437dycc(Z) and 1437dycc(E) is preferably at least 50 mass % from the viewpoint of volatility, more preferably at least 60 mass %, further preferably at least 80 mass %, particularly preferably at least 90 mass %, most preferably at least 95 mass %.

1437dycc may be produced, for example, by subjecting industrially stably available 5-chloro-1,1,2,2,3,3,4,4-octafluoropentane (HCFC-448occc, hereinafter referred to as "448occc") to dehydrofluorination by a liquid phase reaction or a vapor phase reaction. "Subjecting to dehydrofluorination by a liquid phase reaction" means that 448occc in a liquid state is subjected to dehydrofluorination. "Subjecting to dehydrofluorination by a vapor phase reaction" means that 448occc in a vapor state is subjected to dehydrofluorination.

Dehydrofluorination of 448occc may be carried out e.g. by reacting 448occc with sodium methoxide in the presence of methanol or by subjecting 448occc to dehydrofluorination in the presence of a base. Specifically, preferred is a method of subjecting 448occc to dehydrofluorination in an alkali metal aqueous solution in the presence of a phase transfer catalyst.

By the above production method, 1437dycc is obtained as a composition containing 1437dycc(Z) and 1437dycc(E) structural isomers. The composition containing such isomers may be used as it is as the solvent composition according to the present embodiment, or 1437dycc(Z) and 1437dycc(E) separated in a purification step may be used alone or as mixed into a desired mixing ratio.

In the composition containing 1437dycc obtained by the above production method, impurities such as 448occc, 5-chloro-1,1,2,2,3,3,4-heptafluoro-4-methoxypentane, 1-chloro-2,3,3,4,4,5,5-heptafluoro-1-methoxypentane, 1-chloro-3,3,4,4,5,5-hexafluoro-2-methoxypent-1-ene, 2,3,3,4,4,5,5-heptafluoro-1-methoxypent-1-ene and 1-chloro-3,3,4,4,5,5-hexafluoro-1-methoxypent-1-ene may be contained. In the solvent composition according to the present embodiment, such impurities may be contained within a range not to impair the effects of the present invention. Further, 1437dycc purified by a known method may be used.

For example, in a case where a composition containing 1437dycc produced by the above production method is used as it is as the solvent composition of the present embodiment, the purity of 1437dycc of the composition is preferably at least 99 mass %, more preferably at least 99.5 mass %. When the purity of 1437dycc is at least the above lower limit value, the composition containing 1437dycc is less likely to exert an influence by impurities when used for a cleaning agent, a coating solvent, a working fluid, etc.

The proportion of the content of 1437dycc in the solvent composition according to the present embodiment is preferably at least 50 mass % to the total amount of the solvent composition. The upper limit of the proportion of the content may be 100 mass %. The proportion of the content of 1437dycc is more preferably at least 50 mass % and at most 99.999 mass %, further preferably at least 60 mass % and at most 99.999 mass %, particularly preferably at least 80 mass % and at most 99.8 mass %, most preferably at least 90 mass % and at most 99.5 mass %. When the amount of 1437dycc is within the above range, various organic substances are soluble in the solvent composition.

(Solvent Soluble in 1437dycc)

The solvent composition according to the present embodiment may further contain a solvent soluble in 1437dycc (solvent (A)) depending upon the purpose of increasing the solubility of various organic substances, adjusting the volatilization rate, etc. A solvent soluble in 1437dycc means, for example, a solvent such that when mixed with 1437dycc to achieve a desired concentration, stirred at room temperature (25° C.) and left at rest for 5 minutes, it is still uniformly dissolved without two phase separation or turbidity.

The solvent (A) is preferably a solvent selected from a hydrocarbon, an alcohol, a ketone, an ether, an ester, a chlorocarbon, a hydrofluorocarbon (HFC), a hydrofluoroether (HFE), a hydrochlorofluoroolefin (HCFO), a hydrofluoroolefin (HFO), a chlorofluoroolefin (CFO), etc. As the solvent (A), one type may be contained alone, or two or more types may be contained.

The hydrocarbon as the solvent (A) is preferably a hydrocarbon having at least 5 carbon atoms. So long as the hydrocarbon has at least 5 carbon atoms, it may be linear or cyclic, may be a saturated hydrocarbon, or may be an unsaturated hydrocarbon.

The hydrocarbon may, for example, be specifically n-pentane, 2-methylbutane, n-hexane, 2-methylpentane, 2,2-dimethylbutane, 2,3-dimethylbutane, n-heptane, 2-methylhexane, 3-methylhexane, 2,4-dimethylpentane, n-octane, 2-methylheptane, 3-methylheptane, 4-methylheptane, 2,2-dimethylhexane, 2,5-dimethylhexane, 3,3-dimethylhexane, 2-methyl-3-ethylpentane, 3-methyl-3-ethylpentane, 2,3,3-trimethylpentane, 2,3,4-trimethylpentane, 2,2,3-trimethylpentane, 2-methylheptane, 2,2,4-trimethylpentane, n-nonane, 2,2,5-trimethylhexane, n-decane, n-dodecane, cyclopentane, methylcyclopentane, cyclohexane, methylcyclohexane, ethylcyclohexane, bicyclohexane, α-pinene, dipentene, decalin, tetralin or amylnaphthalene.

Among them, in order to further improve the solubility of a mineral oil, more preferred is n-pentane, cyclopentane, n-hexane, cyclohexane, n-heptane or 2,2,4-trimethylpentane. The hydrocarbon may be used alone or in combination of two or more.

The alcohol as the solvent (A) is preferably a $C_{1-16}$ alcohol (excluding compounds mentioned as a phenol compound described hereinafter). So long as the alcohol has from 1 to 16 carbon atoms, it may be linear or cyclic, may be a saturated alcohol or may be an unsaturated alcohol.

The alcohol may, for example, be specifically methanol, ethanol, 1-propanol, isopropanol, 1-butanol, 2-butanol, 1-methyl-1-propanol, 2-methyl-1-propanol, 2-methyl-2-propanol, 1-pentanol, 2-pentanol, 1-ethyl-1-propanol, 2-methyl-1-butanol, 3-methyl-1-butanol, 3-methyl-2-butanol, neopentyl alcohol, 1-hexanol, 2-methyl-1-pentanol, 4-methyl-2-pentanol, 2-ethyl-1-butanol, 1-heptanol, 2-heptanol, 3-heptanol, 1-octanol, 2-octanol, 2-ethyl-1-hexanol, 1-nonanol, 3,5,5-trimethyl-1-hexanol, 1-decanol, 1-undecanol, 1-dodecanol, allyl alcohol, 2-propyn-1-ol, benzyl alcohol, cyclohexanol, 1-methylcyclohexanol, 2-methylcyclohexanol, 3-methylcyclohexanol, 4-methylcyclohexanol, α-terpineol, 2,6-dimethyl-4-heptanol, nonyl alcohol or tetradecyl alcohol.

Among them, with a view to increasing the flux cleaning property and in view of excellent removability of moisture adhering to the article, more preferred is methanol, ethanol, isopropanol, 1-butanol or 2-methyl-1-propanol. The alcohol may be used alone or in combination of two or more.

The ketone as the solvent (A) is preferably a $C_{3-9}$ ketone. So long as the ketone has from 3 to 9 carbon atoms, it may be linear or cyclic, may be a saturated ketone, or may be an unsaturated ketone.

The ketone may, for example, be specifically acetone, methyl ethyl ketone, 2-pentanone, 3-pentanone, 2-hexanone, methyl isobutyl ketone, 2-heptanone, 3-heptanone, 4-heptanone, diisobutyl ketone, mesityl oxide, phorone, 2-octanone, cyclohexanone, methylcyclohexanone, isophorone, 2,4-pentanedione, 2,5-hexanedione or acetophenone. Among them, with a view to further increasing the solubility of a mineral oil, more preferred is acetone, methyl ethyl ketone or methyl isobutyl ketone. The ketone may be used alone or in combination of two or more.

The ether as the solvent (A) is preferably a $C_{2-8}$ ether. So long as the ether has from 2 to 8 carbon atoms, it may be linear or cyclic, may be a saturated ether, or may be an unsaturated ether.

The ether may, for example, be specifically diethyl ether, dipropyl ether, diisopropyl ether, dibutyl ether, ethyl vinyl ether, butyl vinyl ether, anisole, phenetole, methylanisole, furan, methylfuran, tetrahydrofuran, or propylene glycol methyl ether acetate. Among them, with a view to further increasing the solubility of a mineral oil, more preferred is diethyl ether, diisopropyl ether, tetrahydrofuran or propylene glycol methyl ether acetate. The ether may be used alone or in combination of two or more.

The ester as a solvent (A) is preferably a $C_{2-19}$ ester (excluding the above compounds mentioned as an ether). So long as the ester has from 2 to 19 carbon atoms, it may be linear or cyclic, may be a saturated ester, or may be an unsaturated ester.

The ester may, for example, be specifically methyl formate, ethyl formate, propyl formate, butyl formate, isobutyl formate, pentyl formate, methyl acetate, ethyl acetate, propyl acetate, isopropyl acetate, butyl acetate, isobutyl acetate, sec-butyl acetate, pentyl acetate, methoxybutyl acetate, sec-hexyl acetate, 2-ethylbutyl acetate, 2-ethylhexyl acetate, cyclohexyl acetate, benzyl acetate, methyl propionate, ethyl propionate, butyl propionate, methyl butyrate, ethyl butyrate, butyl butyrate, isobutyl isobutyrate, ethyl 2-hydroxy-2-methylpropionate, methyl benzoate, ethyl benzoate, propyl benzoate, butyl benzoate, benzyl benzoate, γ-butyrolactone, diethyl oxalate, dibutyl oxalate, dipentyl oxalate, diethyl malonate, dimethyl maleate, diethyl maleate, dibutyl maleate, dibutyl tartarate, tributyl citrate, dibutyl sebacate, dimethyl phthalate, diethyl phthalate or dibutyl phthalate.

Among them, with a view to further increasing the solubility of a mineral oil, more preferred is methyl acetate or ethyl acetate. The ester may be used alone or in combination of two or more.

The chlorocarbon as the solvent (A) is preferably a $C_{1-3}$ chlorocarbon. So long as the chlorocarbon has from 1 to 3 carbon atoms, it may be linear or cyclic, may be a saturated chlorocarbon, or may be an unsaturated chlorocarbon.

The chlorocarbon may, for example, be specifically methylene chloride, 1,1-dichloroethane, 1,2-dichloroethane, 1,1,2-trichloroethane, 1,1,1,2-tetrachloroethane, 1,1,2,2-tetrachloroethane, pentachloroethane, 1,1-dichloroethylene, cis-1,2-dichloroethylene, trans-1,2-dichloroethylene, trichloroethylene, tetrachloroethylene or 1,2-dichloropropane. Among them, with a view to further increasing the solubility of a mineral oil, more preferred is methylene chloride, trans-1,2-dichloroethylene or trichloroethylene, and in view of excellent cleaning property, further preferred is trans-1,2-dichloroethylene. The chlorocarbon may be used alone or in combination of two or more.

The HFC as the solvent (A) is preferably a $C_{4-8}$ linear or cyclic HFC, more preferably a HFC in which the number of fluorine atoms in one molecule is equal to or higher than the number of hydrogen atoms.

The HFC may, for example, be specifically 1,1,1,3,3-pentafluorobutane, 1,1,1,2,2,3,4,5,5,5-decafluoropentane, 1,1,2,2,3,3,4-heptafluorocyclopentane, 1,1,1,2,2,3,3,4,4-nonafluorohexane, 1,1,1,2,2,3,3,4,4,5,5,6,6-tridecafluorohexane or 1,1,1,2,2,3,3,4,4,5,5,6,6-tridecafluorooctane. Among them, with a view to further increasing the solubility with a fluorinated lubricating oil, more preferred is 1,1,1,2,2,3,4,5,5,5-decafluoropentane, 1,1,1,2,2,3,3,4,4-nonafluorohexane or 1,1,1,2,2,3,3,4,4,5,5,6,6-tridecafluorohexane. The HFC may be used alone or in combination of two or more.

The HFE as the solvent (A) is, with a view to further increasing the solubility of a fluorinated lubricating oil or the like, preferably (perfluorobutoxy)methane, (perfluorobutoxy)ethane, 1,1,1,2,2,3,4,5,5,5-decafluoro-3-methoxy-4-(trifluoromethyl)pentane or 1,1,2,2-tetrafluoro-1-(2,2,2-trifluoroethoxy)ethane. The HFE may be used alone or in combination of two or more.

The HCFO as the solvent (A) may, for example, be (E)- or (Z)-1-chloro-3,3,3-trifluoro-1-propene (HCFO-1233zd), (E)- or (Z)-1-chloro-2,3,3-trifluoro-1-propene (HCFO-1233yd), 1,1-dichloro-3,3,3-trifluoro-1-propene (HCFO-1223za), (E)- or (Z)-1,2-dichloro-3,3,3-trifluoro-1-propene (HCFO-1223xd), or (E)- or (Z)-1,3-dichloro-2,3,3-trifluoro-1-propene (HCFO-1223yd). Among them, with a view to further increasing the solubility of a mineral oil, preferred is HCFO-1233zd(Z), HCFO-1233yd(E) or (Z), or HCFO-1223yd(E) or (Z). The HCFO may be used alone or in combination of two or more.

The HFO as the solvent (A) may be 1,1,1,4,4,4-hexafluoro-2-butene or methoxyperfluoroheptene.

The CFO as the solvent (A) may be 1,1-dichloro-2,3,3,3-tetrafluoro-1-propene (CFO-1214ya).

The solvent (A) is further preferably a solvent having no flash point. The solvent (A) having no flash point may be a HFC such as 1,1,1,2,2,3,4,5,5,5-decafluoropentane, 1,1,1,2,2,3,3,4,4-nonafluorohexane or 1,1,1,2,2,3,3,4,4,5,5,6,6-tridecafluorohexane, a HFE such as (perfluorobutoxy)methane, (perfluorobutoxy)ethane, 1,1,2,2-tetrafluoro-1-(2,2,2-trifluoroethoxy)ethane or 1,1,1,2,2,3,4,5,5,5-decafluoro-3-methoxy-4-(trifluoromethyl)pentane, a HCFO such as HCFO-1233zd(Z), HCFO-1233yd(E) or (Z), or HCFO-1223yd(E) or (Z), or a CFO such as CFO-1214ya.

Even in a case where a solvent having no flash point is used as the solvent (A), it is preferably used as mixed with 1437dycc within a range such that the solvent composition according to the present embodiment has no flash point.

In a case where the solvent composition according to the present embodiment contains the solvent (A), 1437dycc and the solvent (A) may form an azeotropic composition or may form a non-azeotropic composition. In a case where 1437dycc and the solvent (A) forms an azeotropic composition, such an azeotropic composition may be used.

In a case where the solvent composition according to the present embodiment contains the solvent (A), the content of the solvent (A) in the solvent composition according to the present embodiment per 100 parts by mass of the total amount of 1437dycc and the solvent (A) is preferably from 0.1 to 50 parts by mass, more preferably from 0.5 to 20 parts by mass, further preferably from 1 to 10 parts by mass.

When the content of the solvent (A) is at least the above lower limit value, effects by the solvent (A) will be sufficiently obtained. When the content of the solvent (A) is at most the above upper limit value, excellent solubility of organic substances in 1437dycc and drying properties of 1437dycc will not be impaired.

(Stabilizer)

The solvent composition according to the present embodiment preferably contains a stabilizer so as to suppress decomposition of 1437dycc. The stabilizer may be a phenol compound, an ether, an epoxide, an amine, an alcohol or a hydrocarbon. The stabilizer may be used alone or in combination of two or more.

With respect to the stabilizer contained in the solvent composition according to the present embodiment, with respect to the alcohol, the ether and the hydrocarbon, compounds other than the compounds exemplified as the solvent (A) are regarded as the stabilizer. Some of the solvents (A) have a function as a stabilizer, and the following examples of the stabilizer include such compounds, however, such compounds are regarded as a solvent (A) having a function as a stabilizer, and the upper limit of the proportion of the content of such compounds in the solvent composition is in accordance with the upper limit of the proportion of the content of the solvent (A). However, the lower limit of the proportion of the content of the solvent (A) having a function as a stabilizer in the solvent composition is the same as the lower limit value of the proportion of the content of the stabilizer described hereinafter.

The stability of the solvent composition may be evaluated, for example, by the chlorine ion concentration of a test solution having the stabilizer dissolved in a predetermined proportion in 1437dycc after stored for a certain period, as an index. The chlorine ion concentration is measured by ion chromatography.

Specifically, the stabilizer in the solvent composition according to the present embodiment is preferably a stabilizer such that the chlorine ion concentration in the solvent composition is at most 100 mass ppm after the test solution is stored at 50° C. for 3 days, more preferably a stabilizer such that the chlorine ion concentration is at most 50 mass ppm, further preferably at most 10 mass ppm.

Further, evaluation by stability test in accordance with accelerated oxidation test in JIS K1508-1982 may also be possible. Specifically, 150 mL of the test solution is put in a 200 mL two-necked flask, and while oxygen bubbles saturated with moisture are made to flow in a state where a test piece of a cold-rolled steel plate coexists in each of the vapor phase and the liquid phase of the test solution, reflux is conducted by heat generation of a bulb for 96 hours, and the change in outer appearance of the test piece before and after the reflux is taken as the index. For the solvent composition, preferred is a stabilizer such that at least the test piece in the liquid phase does not change in the above evaluation, and more preferred is a stabilizer such that the test pieces both in the liquid phase and in the vapor phase do no change.

The content of the stabilizer in the solvent composition according to the present embodiment, to the solvent composition, is preferably at least 0.5 mass ppm, more preferably at least 1 mass ppm, further preferably at least 5 mass ppm, particularly preferably at least 10 mass ppm. Further, the content of the stabilizer is preferably at most 10 mass %, more preferably at most 5 mass %, particularly preferably at most 1 mass %. The content of the stabilizer within the above preferred range is particularly preferred in that not only excellent stability of 1437dycc is achieved but also properties of 1437dycc such as low surface tension, low viscosity and good permeability will not be impaired.

The respective stabilizers in the present embodiment are considered to have different stabilizing functions. For example, a phenol compound and a hydrocarbon can suppress decomposition of 1437dycc by the antioxidizing effect. Further, it is estimated that an epoxide scavenges an acidic substance generated and an amine neutralizes an acidic substances generated by decomposition, thereby to suppress promotion of decomposition of 1437dycc by the acidic substance. Accordingly, by using two or more types of stabilizers as the case requires, synergistic effect by the stabilizers may be obtained.

The phenol compound in the present embodiment means an aromatic hydroxy compound having at least one hydroxy group in an aromatic hydrocarbon nucleus. The aromatic hydroxy compound is preferably one which is soluble in 1437dycc. The aromatic hydrocarbon nucleus is preferably benzene nucleus. To the aromatic hydrocarbon nucleus, a substituent other than the hydroxy group may be bonded. Such a substituent may, for example, be a hydrocarbon group, an alkoxy group, an acyl group or a carbonyl group. Further, at least one hydrogen atom bonded to the aromatic hydrocarbon nucleus may be substituted by a halogen atom. The hydrocarbon group may, for example, be an alkyl group, an alkenyl group, an aromtaic hydrocarbon group or an aralkyl group.

The alkyl group, the alkenyl group, the alkoxy group, the acyl group and the carbonyl group preferably have at most 6 carbon atoms, and the aromatic hydrocarbon group and the aralkyl group preferably have at most 10 carbon atoms. The hydrocarbon group is preferably an alkyl group or an alkenyl group, particularly preferably an alkyl group. The aromatic hydrocarbon compound preferably has the alkyl group or the alkoxy group at the o-position to the hydroxy group of the aromatic hydrocarbon nucleus. The alkyl group at the o-position is preferably a branched alkyl group such as a tert-butyl group. In a case where the aromatic hydroxy compound has two o-positions, it may have an alkyl group at both the positions.

The phenol compound may, for example, be specifically phenol, 1,2-benzenediol, 1,3-benzenediol, 1,4-benzenediol, 1,3,5-benzenetriol, 2,6-di-tert-butyl-4-methylphenol, 2,4,6-tri-tert-butylphenol, 2-tert-butylphenol, 3-tert-butylphenol, 4-tert-butylphenol, 2,4-di-tert-butylphenol, 2,6-di-tert-butylphenol, 4,6-di-tert-butylphenol, o-cresol, m-cresol, p-cresol, 2,3-dimethylphenol, 2,4-dimethylphenol, 2,5-dimethylphenol, 2,6-dimethylphenol, 2,3,6-trimethylphenol, 2,4,6-trimethylphenol, 2,5,6-trimethylphenol, 3-isopropylphenol, 2-isopropyl-5-methylphenol, 2-methoxyphenol, 3-methoxyphenol, 4-methoxyphenol, 2-ethoxyphenol, 3-ethoxyphenol, 4-ethoxyphenol, 2-propoxyphenol, 3-propoxyphenol, 4-propoxyphenol, α-tocopherol, β-tocopherol, γ-tocopherol or 4-tert-butylcatechol.

Among them, preferred is phenol, 1,2-benzenediol, 2,6-di-tert-butyl-4-methylphenol, m-cresol, 2-isopropyl-5-methylphenol, α-tocopherol, 2-methoxyphenol or 4-methoxyphenol.

The content of the phenol compound in the solvent composition according to the present embodiment to the solvent composition according to the present embodiment is preferably from 0.5 mass ppm to 10 mass %, more preferably from 1 mass ppm to 10 mass %, further preferably from 5 mass ppm to 5 mass %, particularly preferably from 10 mass ppm to 1 mass %. When the content of the phenol compound is within the above preferred range, sufficient stability of 1437dycc will be achieved and in addition, properties of 1437dycc such as low surface tension, low viscosity and good permeability will not be impaired.

Further, the ether in the present embodiment means a linear ether having two hydrocarbon groups bonded to an oxygen atom and a cyclic ether having an oxygen atom as an atom constituting the ring (excluding an epoxy ring which is a 3-membered cyclic ether). The number of etheric oxygen atoms in the linear ether and the cyclic ether may be two or more. The number of carbon atoms in the ether is preferably at most 12. Further, the carbon atom in the hydrocarbon group constituting the ether may have a substituent such as a halogen atom or a hydroxy group. However, an ether having an epoxy group is regarded as an epoxide.

The ether may, for example, be specifically dimethyl ether, diethyl ether, dipropyl ether, diisopropyl ether, dibutyl ether, dipentyl ether, diisopentyl ether, diallyl ether, ethyl methyl ether, ethyl propyl ether, ethyl isopropyl ether, ethyl isobutyl ether, ethyl isopentyl ether, ethyl vinyl ether, allyl ethyl ether, ethyl phenyl ether, ethyl naphthyl ether, ethyl propargyl ether, 1,4-dioxane, 1,3-dioxane, 1,3,5-trioxane, ethylene glycol monomethyl ether, ethylene glycol monobutyl ether, ethylene glycol monophenyl ether, ethylene glycol monobenzyl ether, ethylene glycol dimethyl ether, ethylene glycol diethyl ether, ethylene glycol diphenyl ether, diethylene glycol monomethyl ether, diethylene glycol monoethyl ether, dipropylene glycol methyl ether, anisole, anethol, trimethoxyethane, triethoxyethane, furan, 2-methylfuran or tetrahydrofuran.

The ether is preferably a 4- to 6-membered cyclic ether, particularly preferably 1,4-dioxane, 1,3-dioxane, 1,3,5-trioxane, 2-methylfuran or tetrahydrofuran.

The content of the ether in the solvent composition according to the present embodiment to the solvent composition according to the present embodiment is preferably from 1 mass ppm to 10 mass %, more preferably from 10 mass ppm to 7 mass %, further preferably from 0.01 mass % to 5 mass %. When the content of the ether is within the above preferred range, not only sufficient stability of 1437dycc is achieved, but also properties of 1437dycc such as low surface tension, low viscosity and good permeability will not be impaired.

The epoxide according to the present embodiment means a compound having at least one epoxy group which is a 3-membered cyclic ether. The epoxide may have at least two epoxy groups in one molecule, and may have a substituent such as a halogen atom, an etheric oxygen atom or a hydroxy group. The epoxide preferably has at most 12 carbon atoms.

The epoxide may, for example, be specifically 1,2-propylene oxide, 1,2-butylene oxide, 1,2-epoxy-3-phenoxypropane, butyl glycidyl ether, methyl glycidyl ether, ethyl glycidyl ether, butyl glycidyl ether, vinyl glycidyl ether, allyl glycidyl ether, diethylene glycol diglycidyl ether, epichlorohydrin, d-limonene oxide or l-limonene oxide. Among them, preferred is 1,2-propylene oxide, 1,2-butylene oxide or butyl glycidyl ether.

The content of the epoxide in the solvent composition according to the present embodiment to the solvent composition according to the present embodiment is preferably from 1 mass ppm to 10 mass %, more preferably from 10 mass ppm to 7 mass %, further preferably from 0.01 mass % to 5 mass %. When the content of the epoxide is within the above preferred range, not only sufficient stability of 1437dycc is achieved, but also properties of 1437dycc such as low surface tension, low viscosity and good permeability will not be impaired.

The amine in the present embodiment means a compound having at least one substituted or non-substituted amino group (a primary to tertiary amine). The amine may be a non-cyclic amine or may be a cyclic amine (a cyclic compound in which the nitrogen atom of an amino acid is an atom constituting the ring). The group bonded to the nitrogen atom of a secondary amine or a tertiary amine is preferably an alkyl group or a hydroxyalkyl group having at most 6 carbon atoms. The non-cyclic amine may be an aliphatic amine or an aromatic amine. The aliphatic amine may be a benzene nucleus-containing compound having at least one substituted or non-substituted amino group. The cyclic amine may be a 4- to 6-membered cyclic compound having from 1 to 3 nitrogen atoms constituting the ring. The amine preferably has at most 16, more preferably at most 10 carbon atoms.

The amine may, for example, be specifically methylamine, dimethylamine, trimethylamine, ethylamine, diethylamine, triethylamine, n-propylamine, di-n-propylamine, isopropylamine, diisopropylamine, butylamine, dibutylamine, tributylamine, isobutylamine, diisobutylamine, sec-butylamine, tert-butylamine, pentylamine, dipentylamine, tripenthylamine, hexylamine, 2-ethylhexylamine, allylamine, diallylamine, triallylamine, aniline, N-methylaniline, N,N-dimethylaniline, N,N-diethylaniline, pyridine, picoline, morpholine, N-methylmorpholine, benzylamine, dibenzylamine, α-methylbenzylamine, propylenediamine, diethylhydroxyamine, pyrrole, N-methylpyrrole, 2-methylpyridine, 3-methylpyridine, 4-methylpyridine, ethanolamine, diethanolamine, triethanolamine, propanolamine, dipropanolamine, isopropanolamine, diisopropanolamine, N-methylethanolamine, N,N-dimethylethanolamine, N-ethylmorpholine, diphenylamine or ethylenediamine.

The amine is preferably an alkylamine or a cyclic amine, particularly preferably pyrrole, N-methylpyrrole, 2-methylpyridine, n-propylamine, diisopropylamine, N-methylmorpholine or N-ethylmorpholine.

The content of the amine in the solvent composition according to the present embodiment to the solvent composition according to the present embodiment is preferably from 1 mass ppm to 10 mass %, more preferably from 5 mass ppm to 5 mass %, further preferably from 10 mass ppm to 1 mass %, most preferably from 10 mass ppm to 0.1 mass %. When the amine content is within the above referred range, not only sufficient stability of 1437dycc is achieved, but also properties of 1437dycc such as low surface tension, low viscosity and good permeability will not be impaired.

Further, the amine, which has a buffering function, scavenges an acid generated when 1437dycc is decomposed, prevents an acid content increase and suppresses further decomposition reaction, and scavenges an acid content brought from outside, thereby to minimize influence by external factors.

Further, the alcohol in the present embodiment means an organic compound having a hydroxy group bonded to a linear, branched or cyclic hydrocarbon (excluding the above-described compounds mentioned as a phenol compound). The alcohol in the present embodiment is preferably an alcohol having a boiling point of from 80 to 120° C. which is soluble in 1437dycc and which volatilizes together with 1437dycc and is thereby less likely to remain on the surface of an article.

The alcohol may, for example, be specifically methanol, ethanol, 1-propanol, isopropanol, 1-butanol, 2-butanol, 2-methyl-1-propanol, 2-methyl-2-propanol, 1-pentanol, 2-pentanol, 1-ethyl-1-propanol, 2-methyl-1-butanol, 3-methyl-1-butanol, 3-methyl-2-butanol, 2,2-dimethyl-1-propanol, 1-hexanol, 2-methyl-1-pentanol, 4-methyl-2-pentanol, 2-ethyl-1-butanol, 1-heptanol, 2-heptanol, 3-heptanol, 1-octanol, 2-octanol, 2-ethyl-1-hexanol, 1-nonanol, 3,5,5-trimethyl-1-hexanol, 1-decanol, 1-undecanol, 1-dodecanol, allyl alcohol, benzyl alcohol, cyclohexanol, 1-methylcyclohexanol, 2-methylcyclohexanol, 3-methylcyclohexanol, 4-methylcyclohexanol, a-terpineol, 2,6-dimethyl-4-heptanol, nonyl alcohol, tetradecyl alcohol or 2-propyn-1-ol.

Among them, in view of excellent volatility of the solvent composition, more preferred is 1-propanol, isopropanol, 1-butanol, 2-butanol, 2-methyl-1-propanol, 2-methyl-2-propanol, 3-methyl-2-butanol, 2,2-dimethyl-1-propanol, 2-pentanol, 1-ethyl-1-propanol, allyl alcohol or 2-propyn-1-ol.

The content of the alcohol in the solvent composition according to the present embodiment to the solvent composition according to the present embodiment is preferably from 1 mass ppm to 10 mass %, more preferably from 5 mass ppm to 5 mass %, further preferably from 10 mass ppm to 1 mass %, most preferably from 10 mass ppm to 0.1 mass %. When the alcohol content is within the above preferred range, not only sufficient stability of 1437dycc is achieved, but also properties of 1437dycc such as low surface tension, low viscosity and good permeability will not be impaired.

The hydrocarbon in the present embodiment is an organic compound having linear, branched or cyclic hydrocarbon molecules. In the present embodiment, the hydrocarbon may be a saturated hydrocarbon or may be an unsaturated hydrocarbon in which at least one carbon-carbon bond is an unsaturated bond. The hydrocarbon in the present embodiment is preferably a $C_{5-9}$ chain or cyclic hydrocarbon, which is soluble in 1437dycc, which has volatility, and which volatilized together with 1437dycc and is thereby less likely to remain on the surface of an article.

The saturated hydrocarbon may, for example, be specifically, n-pentane, n-hexane, 2-methylpentane, 3-methylpentane, 2,2-dimethylbutane, 2,3-dimethylbutane, n-heptane, 2-methylhexane, 3-methylhexane, 2,4-dimethylpentane, 2-methylheptane, 3-methylheptane, 4-methylheptane, 2,2-dimethylhexane, 2,5-dimethylhexane, 3,3-dimethylhexane, 2-methyl-3-ethylpentane, 3-methyl-3-ethylpentane, 2,3,3-trimethylpentane, 2,3,4-trimethylpentane, 2,2,3-trimethylpentane, 2-methylheptane, 2,2,4-trimethylpentane, cyclopentane, methylcyclopentane, cyclohexane or methylcyclohexane. Among them, more preferred is n-pentane, cyclopentane, n-hexane, cyclohexane, n-heptane or 2,2,4-trimethylpentane.

The unsaturated hydrocarbon may, for example, be specifically a pentene isomer such as 1-pentene, 2-pentene, 2-methyl-1-butene, 3-methyl-1-butene or 2-methyl-2-butene, a hexene isomer such as 1-hexene, 2-hexene, 3-hexene, 2-methyl-1-pentene, 3-methyl-1-pentene, 4-methyl-1-pentene, 2-ethyl-1-butene, 3-ethyl-1-butene, 3-ethyl-2-butene, 2-methyl-2-pentene, 3-methyl-2-pentene, 4-methyl-2-pentene or 2,3-dimethyl-2-butene, a heptene isomer such as 1-heptene, 2-heptene, 3-heptene, 4-heptene or 3-ethyl-2-pentene, an octene isomer such as 1-octene, 2,4,4,-trimethyl-1-pentene or 2,4,4-trimethyl-2-pentene, a nonene isomer such as 1-nonene, a diene compound such as butadiene, isoprene, hexadiene, heptadiene or octadiene, or an unsaturated cyclic compound such as cyclohexene, cyclohexadiene, cycloheptene, cycloheptadiene, cyclooctene or cyclooctadiene.

In the present embodiment, particularly preferred is 2-methyl-2-butene, 2-methyl-1-pentene, 2-methyl-2-pentene, 3-ethyl-2-butene, 2,3-dimethyl-2-butene, 2,4,4-trimethyl-1-pentene or 2,4,4-trimethyl-2-pentene.

Among the above hydrocarbons, an unsaturated hydrocarbon has a higher antioxidizing effect by scavenging oxygen than a saturated hydrocarbon, and an unsaturated hydrocarbon is more preferred as a stabilizer for 1437dycc.

The content of the hydrocarbon in the solvent composition according to the present embodiment to the solvent composition according to the present embodiment is preferably from 1 mass ppm to 10 mass %, more preferably from 5 mass ppm to 7 mass %, further preferably from 10 mass ppm to 5 mass %, most preferably from 10 mass ppm to 0.1 mass %. When the content of the hydrocarbon is within the above preferred range, not only sufficient stability of 1437dycc is achieved, but also properties of 1437dycc such as low surface tension, low viscosity and good permeability will not be impaired.

In a case where the solvent composition according to the present embodiment is in contact with copper or a copper alloy, in order to prevent such a metal from being corroded, the solvent composition may contain a nitro compound or a triazole compound. The nitro compound is nitromethane, nitroethane, 1-nitropropane, 2-nitropropane or 1-nitroethylene. It is more preferably nitromethane or nitroethane. The triazole compound is selected from 2-(2'-hydroxy-5'-methylphenyl)benzotriazole, 2-(2'-hydroxy-3'-tert-butyl-5'-methylphenyl)-5-chlorobenzotriazole, 1,2,3-benzotriazole, 1-[(N,N-bis-2-ethylhexyl)aminomethyl]benzotriazole, etc., and is more preferably 1,2,3-benzotriazole. The content of the nitro compound or the triazole compound to the solvent composition is preferably from 10 mass ppm to 1 mass %.

In a case where the solvent composition of the present invention is used for a cleaning apparatus, in the cleaning apparatus or in an apparatus to recover/regenerate the solvent composition after used, evaporation and condensation are repeated. Further, in a case where the solvent composition of the present invention is used as a coating solvent of a non-volatile substance, in an apparatus to recover/regenerate the solvent composition after used, evaporation and condensation are repeated. When the solvent composition is used for an application involving its phase change in such a manner, the solvent composition preferably contains a stabilizer. Since a stabilizer is preferably one which evaporates and condenses together with 1437dycc, the stabilizer is preferably a compound having a boiling point of from 80 to 120° C.

Specifically, preferred is 1-propanol (bp: 97.2° C.), isopropanol (bp: 82.4° C.), 1-butanol (bp: 118° C.), 2-butanol (bp: 100° C.), 2-methyl-1-propanol (bp: 108° C.), 2-methyl-2-propanol (bp: 82.4° C.), 3-methyl-2-butanol (bp: 112° C.), 2,2-dimethyl-1-propanol (bp: 113 to 114° C.), 2-pentanol (bp: 119.3° C.), 1-ethyl-1-propanol (bp: 114° C.), allyl alcohol (bp: 97° C.), 2-propyn-1-ol (bp: 112° C.), 2,4,4-trimethyl-1-pentene (bp: 112° C.), 2,4,4-trimethyl-2-pentene (bp: 112° C.), n-heptane (bp: 98° C.), 2,2,4-trimethylpentane (bp: about 99° C.), N-methylpyrrole (bp: 113° C.) or N-methylmorpholine (bp: 116° C.).

With a view to using the solvent composition stably over a long time, the solvent composition preferably contains a stabilizer having a boiling point of from 80 to 120° C. and a phenol compound. The phenol compound is preferably phenol, 1,2-benzenediol, 2,6-di-tert-butyl-4-methylphenol, m-cresol, 2-isopropyl-5-methylphenol, α-tocopherol, 2-methylphenol or 4-methoxyphenol.

Further, with a view to using the solvent composition repeatedly, the stabilizer is preferably a water-insoluble compound. The water-insoluble stabilizer may, for example, be a saturated hydrocarbon or an unsaturated hydrocarbon. By using a water-insoluble compound as the stabilizer, even when a regeneration treatment such that the solvent composition is brought into contact with a solid adsorbent, the stabilizer will not be adsorbed, whereby the stability of the solvent composition is maintained.

The above-described solvent composition according to the present embodiment is a solvent composition in which various organic substances are soluble and which has no adverse effect on global environment.

The solvent composition according to the present embodiment may be used for a variety of materials such as a metal, a resin, an elastomer, fibers, glass and a ceramic.

The solvent composition according to the present embodiment is particularly suitable as a cleaning agent to clean an article, a solvent composition in which a non-volatile solute is dissolved to apply the solution on an article to be coated, and a heat transfer fluid for a heat cycle system used to heat or cool an article.

<Cleaning Method>

The method for cleaning an article to be cleaned using the solvent composition according to the present embodiment comprises bringing the solvent composition according to the present embodiment and an article to be cleaned into contact with each other. The cleaning method according to the present embodiment is not particularly limited so long as the solvent composition according to the present embodiment is brought into contact with the surface of an article to be cleaned to remove stains adhering to the article to be cleaned. For example, manual cleaning, immersion cleaning, spray cleaning, immersion-oscillation cleaning, immersion ultrasonic cleaning, steam cleaning, a combination thereof, or the like may be employed. As a cleaning apparatus, cleaning conditions, etc. may be properly selected from known ones, and the solvent composition can be used repeatedly over a long time without decomposition.

A material of the article to be cleaned to which the solvent composition is applicable may, for example, be a metal, a resin, an elastomer such as a rubber, fibers, glass, a ceramic or a composite material thereof. The composite material may, for example, be a laminate of a metal and a resin.

As a cleaning application employing the solvent composition according to the present embodiment, cleaning and removing of flux, a processing oil, wax, a release agent, dust and the like adhering to various articles may be mentioned. As more specific examples of the article to be cleaned, fiber products, medical appliances, electric equipment, precision instruments, optical articles, their parts, and the like may be mentioned. As specific examples of the electric equipment, the precision instruments, the optical articles, and their parts, an IC, a capacitor, a printed-circuit board, a micromotor, a relay, a bearing, an optical lens and a glass substrate may, for example, be mentioned.

The cleaning method according to the present embodiment may be a cleaning method comprising a solvent contact step once or twice or more times of bringing the article to be cleaned into contact with the solvent composition according to the present embodiment in a liquid phase, and a vapor contact step of exposing the article to be cleaned to a vapor generated by evaporating the solvent composition according to the present embodiment, after the solvent contact step. Specifically, for example, the cleaning method according to the present embodiment is applicable to a cleaning apparatus as disclosed in WO2008/149907 and a cleaning method by the cleaning apparatus.

In a case where cleaning is carried out in the cleaning apparatus disclosed in WO2008/149907 by using the solvent composition according to the present embodiment, the temperature of the solvent composition according to the present embodiment in a first dipping tank in which the first solvent contact step is carried out is preferably set to at least 25° C. and less than the boiling point of the solvent composition. Within the above range, it is possible to easily perform the degreasing cleaning of a processing oil or the like, and a cleaning effect by the ultrasonic wave is high. Further, the temperature of the solvent composition according to the present embodiment in a second dipping tank in which the second solvent contact step is carried out is preferably set to 10 to 55° C. Within the above range, in the vapor contact step, a difference between a temperature of the article to be cleaned and a temperature of the vapor of the solvent can be obtained sufficiently, and therefore a sufficient amount of the solvent for vapor cleaning can be condensed on the surface of the article to be cleaned, thereby resulting in a high rinsing effect. In addition, the temperature of the solvent composition according to the present embodiment in the first dipping tank is preferably higher than the temperature of the solvent composition in the second dipping tank in terms of detergency.

The solvent composition according to the present embodiment is suitable as a cleaning agent for the clothing, that is, a dry cleaning solvent.

As a dry cleaning application using the solvent composition according to the present embodiment, cleaning and removing of dirt adhering to clothing such as a shirt, a sweater, a jacket, a skirt, trousers, a windbreaker, gloves, a muffler, and a stole may be mentioned.

Moreover, the solvent composition according to the present embodiment is applicable to dry cleaning of the clothing made of fibers of cotton, hemp, wool, rayon, polyester, acryl, and nylon.

Further, it is estimated that 1437dycc contained in the solvent composition according to the present embodiment, which contains chlorine atoms in its molecule, has high solubility of the dirt and has cleaning power nearly equal to that of HCFCs such as dichloropentafluoropropane (HCFC-225) having a wide range of solvency, with respect to oil and fat dirt.

Moreover, when the solvent composition according to the present embodiment is used as contained in the dry cleaning solvent composition, it is possible to use a surfactant in combination in order to enhance the ability to remove water-soluble dirt such as sweat or mud. The surfactant may, for example, be a cationic, nonionic, anionic, or ampholytic surfactant or the like. 1437dycc having chlorine atoms in its molecule provides solubility of a variety of organic compounds, and it is not required to optimize the surfactant depending on the solvent as HFEs and HFCs, and various surfactants may be used. Hence, when the solvent composition according to the present embodiment is used as the dry cleaning solvent composition, the dry cleaning solvent composition can contain at least one type of the surfactant selected from the group consisting of the cationic surfactant, the nonionic surfactant, the anionic surfactant, and the ampholytic surfactant, together with the solvent composition according to the present embodiment.

The cationic surfactant may be a quaternary ammonium salt such as dodecyldimethylammonium chloride or trimethylammonium chloride. The nonionic surfactant may be a surfactant such as polyoxyalkylene nonyl phenyl ether, polyoxyalkylene alkyl ether, fatty acid alkanolamide, glycerin fatty acid ester, sorbitan fatty acid ester, sucrose fatty acid ester, propylene glycol fatty acid ester, or ester of phosphoric acid and fatty acid. The anionic surfactant may, for example, be an alkyl sulfate ester salt such as a polyoxyethylene alkyl sulfate ester salt, a carboxylate such as a fatty acid salt (soap), or a sulfonate such as an α-olefin sulfonate or lauryl sulfate. The ampholytic surfactant may be a betaine compound such as an alkylbetaine. Further, a compound having a hydrogen atom of the above-described compound substituted by a halogen atom may also be used.

The proportion of the content of the surfactant in the dry cleaning solvent composition is preferably from 0.01 to 10 mass %, more preferably from 0.1 to 5 mass %, further preferably from 0.2 to 2 mass %. The proportion of the content of the solvent composition according to the present embodiment in the dry cleaning solvent composition is preferably the proportion of the remainder except the surfactant.

<Coating Film-Forming Composition and Method for Producing Substrate with Coating Film>

The solvent composition according to the present embodiment is used as a solvent for dilution coating of a nonvolatile substance. That is, the solvent composition according to the present embodiment may be used, as a coating film-forming composition having a nonvolatile substance dissolved in the solvent composition according to the present embodiment, for forming a coating film formed of the nonvolatile substance. The method for producing a substrate with a coating film according to the present embodiment, in other words, the method of forming a coating film on a substrate, comprises applying the coating film-forming composition to a substrate which is an article to be coated, and then evaporating the solvent composition to form a coating film containing the nonvolatile substance as the main component. The coating film preferably consists of the non-volatile substance.

The nonvolatile substance in the present invention means a substance which has a boiling point higher than the solvent composition of the present invention and remains on the surface even after the solvent composition is evaporated. The nonvolatile substance may, for example, be specifically a lubricant to impart lubricity to an article to be coated, an anticorrosive to impart an anticorrosive effect to a metal member, or a surface treatment agent to impart moisture resistance, antifouling property, water/oil repellency and the like to an article to be coated.

An example in which a coating film-forming composition having a lubricant dissolved in the solvent composition according to the present embodiment is used as a lubricant solution to form a coating film containing the lubricant as the main component (hereinafter sometimes referred to as "lubricant coating film") on a substrate as an article to be coated will be described hereinafter.

The lubricant means one which is used for reducing friction on a contact surface and preventing generation of heat and abrasion damage when two members move in a state where their surfaces are brought into contact with each other. The lubricant may be any form of liquid (oil), semi-solid (grease), and solid.

As the lubricant, in terms of excellent solubility in 1437dycc, a fluorinated lubricant or a silicone-based lubricant is preferred. The fluorinated lubricant means a lubricant having a fluorine atom in its molecule. Further, the silicone-based lubricant means a lubricant including silicone.

The lubricant contained in the lubricant solution may be one or a combination of two or more. Each of the fluorinated lubricant and the silicone-based lubricant may be used alone, or they may be used in combination.

As the fluorinated lubricant, a fluorinated oil, fluorinated grease, or a fluorinated solid lubricant such as resin powder of polytetrafluoroethylene may be mentioned. As the fluorinated oil, a low polymer of perfluoropolyether or chlorotrifluoroethylene is preferred. For example, trandemanes "Krytox (registered trademark) GPL102" (manufactured by Du Pont Co., Ltd.), "DAIFLOIL #1", "DAIFLOIL #3", "DAIFLOIL #10", "DAIFLOIL #20" "DAIFLOIL #50", "DAIFLOIL #100", "DEMNUM S-65" (manufactured by Daikin Industries, Ltd.) may, for example, be mentioned.

As the fluorinated grease, one in which a fluorinated oil such as a low polymer of perfluoropolyether or chlorotrifluoroethylene is used as a base oil and powder of polytetrafluoroethylene or other thickeners are compounded is preferred. For example, trandemanes "Krytox (registered trademark) grease 240AC" (manufactured by Du Pont Co., Ltd.), "DAIFLOIL grease DG-203", "DEMNUM L65", "DEMNUM L100", "DEMNUM L200", (manufactured by Daikin Industries, Ltd.), "Sumitec F936" (manufactured by SUMICO LUBRICANT CO., LTD.), "Molykote (registered trademark) HP-300", "Molykote (registered trademark) HP-500", "Molykote (registered trademark) HP-870", "Molykote (registered trademark) 6169" (manufactured by Dow Corning Toray Co., Ltd.) may, for example, be mentioned.

As the silicone-based lubricant, a silicone oil or silicone grease may be mentioned. As the silicone oil, dimethyl silicone, methyl hydrogen silicone, methyl phenyl silicone, cyclic dimethyl silicone, and a modified silicone oil having an organic group introduced into a side chain or a terminal are preferred. For example, tradenames "Shin-Etsu Silicone KF-96", "Shin-Etsu Silicone KF-96-50CS", "Shin-Etsu Silicone KF-965", "Shin-Etsu Silicone KF-968", "Shin-Etsu Silicone KF-99", "Shin-Etsu Silicone KF-50", "Shin-Etsu Silicone KF-54", "Shin-Etsu Silicone HIVAC F-4", "Shin-Etsu Silicone HIVAC F-5", "Shin-Etsu Silicone KF-56A", "Shin-Etsu Silicone KF-995" (manufactured by Shin-Etsu Chemical Co., Ltd.), "MDX4-4159" and "SH200" (manufactured by Dow Corning Toray Co., Ltd.) may, for example, be mentioned.

As the silicone grease, products in which the above-mentioned various silicone oils are used as a base oil and a thickener such as a metal soap or various additives are compounded are preferred. For example, trandemanes "Shin-Etsu Silicone G-30 Series", "Shin-Etsu Silicone G-40 Series", "Shin-Etsu Silicone FG-720 Series", "Shin-Etsu Silicone G-411", "Shin-Etsu Silicone G-501", "Shin-Etsu Silicone G-6500", "Shin-Etsu Silicone G-330", "Shin-Etsu Silicone G-340", "Shin-Etsu Silicone G-350", "Shin-Etsu Silicone G-630" (manufactured by Shin-Etsu Chemical Co., Ltd.), "Molykote (registered trademark) SH33L", "Molykote (registered trademark) 41", "Molykote (registered trademark) 44", "Molykote (registered trademark) 822M", "Molykote (registered trademark) 111", "Molykote (registered trademark) grease for high vacuum", and "Molykote (registered trademark) heat diffusion compound" (manufactured by Dow Corning Toray Co., Ltd.), may, for example, be mentioned.

Further, as one which can be exemplified both as the fluorinated lubricant and as the silicone-based lubricant, a fluorosilicone oil which is a modified silicone oil having a terminal or a side chain substituted by a fluoroalkyl group may be mentioned. For example, trandemanes "Unidyne (registered trademark) TG-5601" (manufactured by Daikin Industries, Ltd.), "Molykote (registered trademark) 3451", "Molykote (registered trademark) 3452", (manufactured by Dow Corning Toray Co., Ltd.), "Shin-Etsu Silicone FL-5", "Shin-Etsu Silicone X-22-821", "Shin-Etsu Silicone X-22-822", and "Shin-Etsu Silicone FL-100" (manufactured by Shin-Etsu Chemical Co., Ltd.) may, for example, be mentioned.

These lubricants can be used as a coating film for, for example, industrial equipment, tray parts for a CD and a DVD in a personal computer and an audiovisual apparatus, household appliances and office equipment such as a printer, a copier, and a flux device, and the like for which the fluorinated lubricant is used commonly as the coating film. Further, they can be used for a needle and a cylinder of a syringe, medical tube parts, and the like for which the silicone-based lubricant is used commonly as the coating film.

The content of the lubricant in the lubricant solution to the total amount of the lubricant solution is preferably from 0.01 to 50 mass %, more preferably from 0.05 to 30 mass %, and further preferably from 0.1 to 20 mass %. The remainder except the lubricant of the lubricant solution consists of the solvent composition. As long as the content of the lubricant is in the above-described range, the film thickness of a coating film when the lubricant solution is applied and the thickness of a lubricant coating film after drying are easily regulated in a proper range.

As a method of applying the lubricant solution, for example, coating by a brush, coating by spraying, coating by immersing the article to be coated in the lubricant solution, a coating method by bringing the lubricant solution into contact with an inner wall of a tube or a needle by pumping up the lubricant solution, may, for example, be mentioned.

As a method of evaporating the solvent composition from the lubricant solution applied to the article to be coated, a known drying method may be mentioned. As the drying method, for example, air drying, drying by heating, or the like may be mentioned. The drying temperature is preferably from 20 to 100° C.

A coating film-forming composition having an anticorrosive agent dissolved in the solvent composition according to the present embodiment may be used as an anticorrosive agent solution to form a coating film containing the anticorrosive agent as the main component (hereinafter sometimes referred to as "anticorrosive agent coating film") on a substrate as an article to be coated.

The anticorrosive agent in the present embodiment means a substance which covers the surface of a metal which is easily oxidized by oxygen in the air to form rust and shields the metal surface from oxygen thereby to prevent the metal material from rusting. The anticorrosive agent may be a mineral oil or a synthetic oil such as polyol ester, polyalkylene glycol or polyvinyl ether.

The content of the anticorrosive agent in the anticorrosive agent solution may be the same as the content of the lubricant in the lubricant solution, including the preferred range. The method of applying the anticorrosive agent solution is the same as the application of the lubricant solution and coating by a brush, coating by spraying, coating by immersing the article to be coated in the anticorrosive agent solution, may, for example, be mentioned. The method of drying the anticorrosive agent solution applied to the article to be coated to form an anticorrosive agent coating film may also be the same as the method of forming the lubricant coating film.

A coating film-forming composition having a surface treatment agent to impart moisture resistance or antifouling property to an article to be coated of e.g. an elastomer such as a rubber, a resin, a metal, glass or a printed circuit board, dissolved in the solvent composition according to the present embodiment, may be prepared as a surface treatment agent solution to form a coating film containing the surface treatment agent as the main component (hereinafter sometimes referred to as "surface treatment agent coating film") on a substrate as an article to be coated.

As examples of products of the surface treatment agent to impart moisture resistance, products containing a cyclic olefin copolymer, such as TOPAS 5013, TOPAS 6013, TOPAS 8007 (manufactured by Polyplastics Co., Ltd.), Apel 6011T, Apel 8008T (manufactured by Mitsui Chemicals Inc.), products containing a cycloolefin polymer, such as ZEONOR 1020R, ZEONOR 1060R (manufactured by Zeon Corporation), products containing a fluorinated compound, such as SFCOAT SFE-DP02H, SNF-DP20H (manufactured by AGC SEIMI CHEMICAL CO., LTD.), OPTOACE WP-100 series (manufactured by Daikin Industries, Ltd.), Fluoro Surf FG-3030 series, FG-3020, FG-3650 (manufactured by Fluoro Technology Co., Ltd.), SURECO 1 series (manufactured by Asahi Glass Company, Limited) may, for example, be mentioned.

As the surface treatment agent to impart antifouling property, a fluorinated compound having a perfluoropolyether chain or a perfluoroalkyl group and a hydrolysable silyl group may, for example, be mentioned. As examples of products, KY-100 series (manufactured by Shin-Etsu Chemical Co., Ltd.), OPTOOL DSX, OPTOOL DAC (manufactured by Daikin Industries Ltd.), Fluoro Surf FG-5000 series (manufactured by Fluoro Technology Co., Ltd.), SR-4000A (manufactured by AGC SEIMI CHEMICAL CO., LTD.), Afluid S-550, SURECO 2 series (manufactured by Asahi Glass Company, Limited) may, for example, be mentioned.

The content of the anticorrosive agent in the surface treatment agent solution may be the same as the content of the lubricant in the lubricant solution, including the preferred range. The method of applying the surface treatment agent solution is the same as the application of the lubricant solution and coating by a brush, coating by spraying, coating by immersing the article to be coated in the surface treatment agent solution, may, for example, be mentioned. The method of drying the surface treatment agent solution applied to the article to be coated to form a surface treatment agent coating film may also be the same as the method of forming the lubricant coating film.

As the article to be coated with the lubricant, the anticorrosive agent or the surface treatment agent, articles to be coated made of various materials such as a metal, a resin, an elastomer, glass and a ceramic may be used.

The solvent composition according to the present embodiment before such a lubricant, anticorrosive agent, surface treatment agent or the like is dissolved, and the solvent composition in the state of a solution, can be used without being decomposed during storage or use. The above described solvent composition according to the present embodiment provides excellent solubility and has a short life in the air even evaporated and thereby has no adverse effect on the global environment. Further, the solvent composition according to the present embodiment can be used in a stable state without decomposition.

<Heat Transfer Fluid>

The solvent composition according to the present embodiment may be used as a heat transfer fluid (working fluid) for a heat cycle system, whereby a substance can be heated or cooled.

The heat cycle system may, for example, be a Rankine cycle system, a heat pump cycle system, a refrigerating cycle system, a heat transport system or a secondary refrigerant cooling system.

The heat cycle system may, for example, be specifically a refrigeration equipment, an air-conditioning equipment, a power generation system, a heat transfer apparatus or a secondary cooling machine.

The power generation system is preferably a power generation system by Rankine cycle system (such as binary cycle power generation). The power generation system may, for example, be specifically a system wherein in an evaporator, a working fluid is heated by e.g. geothermal energy, solar heat or waste heat in a medium temperature range to high temperature range at a level of from 50 to 200° C., and the vaporized working fluid in a high temperature and high pressure state is adiabatically expanded by an expansion device, so that a power generator is driven by the work generated by the adiabatic expansion to carry out power generation.

The heat transport apparatus is preferably a latent heat transport apparatus. The latent heat transport apparatus may, for example, be a heat pipe conducting latent heat transport utilizing evaporation, boiling, condensation, etc. of a working fluid filled in an apparatus, and a two-phase closed thermosiphon. A heat pipe is applied to a relatively small-sized cooling apparatus such as a cooling apparatus of a heating portion of a semiconductor device and electronic equipment. A two-phase closed thermosiphon is widely used for a gas/gas heat exchanger, to accelerate snow melting and to prevent freezing of roads, since it does not require a wick and its structure is simple.

The refrigeration equipment may, for example, be specifically a showcase (such as a built-in showcase or a separate showcase), a commercial refrigerator-freezer, a vending machine or an ice making machine.

The air-conditioning equipment may, for example, be specifically a room air-conditioner, a packaged air-conditioner (such as a store packaged air-conditioner, a building packaged air-conditioner or a plant packaged air-conditioner), a heat source apparatus chilling unit, a gas engine heat pump, a train air-conditioning system or an automobile air-conditioning system.

Now, as an example of the heat cycle system, a refrigerating cycle system will be described.

The refrigerating cycle system is a system such that in an evaporator, a working fluid removes a heat energy from a load fluid to cool the load fluid for cooling to a lower temperature. A refrigerating cycle system is a system comprising a compressor to compress a high temperature/low pressure working fluid vapor A to form a high temperature/high pressure working fluid vapor B, a condenser to cool and liquefy the compressed working fluid vapor B to form a low temperature/high pressure working fluid C, an expansion valve to let the working fluid C discharged from the condenser expand to form a low temperature/low pressure working fluid D, an evaporator to heat the working fluid D discharged from the expansion valve to form a high temperature/low pressure working fluid vapor A, a pump to supply a load fluid E to the evaporator, and a pump to supply a fluid F to the condenser.

Further, for the working fluid according to the present embodiment, a lubricant may be used. As the lubricant, a known lubricant used for a heat cycle system may be used. The lubricant may, for example, be an oxygen-containing synthetic oil (such as an ester lubricant or an ether lubricant), a fluorinated lubricant, a mineral oil or a hydrocarbon synthetic oil.

Further, the working fluid according to the present embodiment is applicable to a secondary circulation cooling system.

The secondary circulation cooling system is a system comprising a primary cooling means of cooling a primary refrigerant comprising ammonia or a hydrocarbon refrigerant, a secondary circulation cooling means of circulating a secondary refrigerant for a secondary circulation cooling system (hereinafter referred to as "secondary refrigerant") to cool an object to be cooled, and a heat exchanger to conduct heat exchange between the primary refrigerant and the secondary refrigerant to cool the secondary refrigerant. By this secondary circulation cooling system, the object to be cooled can be cooled. The working fluid according to the present embodiment is suitably used as a secondary refrigerant.

EXAMPLES

Production Example: Production of 1437dycc

Into a 0.2 L four-necked flask equipped with a stirrer and a Dimroth condenser, 100.7 g of 448occc and 1.0 g of tetra-n-butylammonium bromide (TBAB) as a phase transfer catalyst were put, and the flask was cooled to 10° C. While the reaction temperature was kept at 10° C., 153.9 g of a 34 mass % potassium hydroxide (KOH) aqueous solution was dropwise added over a period of 30 minutes. Then, stirring was continued for 38 hours. The obtained reaction liquid was separated into an organic phase and an aqueous phase, and the organic layer was recovered.

The recovered organic phase was purified to obtain 78.6 g of an isomer mixture of 1437dycc(Z) with a purity of 99.5% and 1437dycc(E). In the isomer mixture, the mass ratio (1437dycc(Z)/1437dycc(E)) of 1437dycc(Z) to 1437dycc(E) was 99/1. Further, an isomer mixture obtained by a similar reaction was purified by distillation to produce 1437dycc(Z) with a purity of 99.5% and 1437dycc(E) with a purity of 99.5%.

Ex. 1 to 3

<Preparation of Solvent Composition>

The isomer mixture of 1437dycc(Z)/1437dycc(E) in a mass ratio of 99/1 obtained in Production Example was taken as the solvent composition in Ex. 1. Isomer mixtures of 1437dycc in mass ratios of 1437dycc(Z)/1437dycc(E) of 95/5 and 75/25 were prepared and taken as the solvent compositions in Ex. 2 and 3, respectively. Hereinafter 1437dycc(Z)/1437dycc(E) ratio represents the mass ratio.

All the isomer mixtures of 1437dycc(Z) and 1437dycc(E) constituting the solvent compositions in Ex. 1 to 3 are a 1437dycc composition having a 1437dycc concentration in the composition of 99.5%.

<Drying Property Test>

50 g of each of the isomer mixture of 1437dycc(Z)/1437dycc(E) in a ratio of 99/1 (solvent composition in Ex. 1) and the isomer mixture of 1437dycc(Z)/1437dycc(E) in a ratio of 75/25 (solvent composition in Ex. 3) as a solvent composition was put in a 200 mL beaker, and a phenol resin plate (tradename: CHEMSURF) of 100 mm×50 mm×4 mm in thickness was immersed in each 200 mL beaker. The phenol resin plate was taken out from the solvent composition and lifted up to a height of 200 mm in one second, and the drying property on the surface of the phenol resin plate was visually confirmed. As a result, it was confirmed that the evaporation rate of the isomer mixture of 1437dycc(Z)/1437dycc(E) in a ratio of 99/1 was higher.

Ex. 4 to 17

<Preparation of Solvent Composition>

Solvent compositions of Ex. 4 to 17 were prepared by using the isomer mixture of 1437dycc(Z)/1437dycc(E) in a ratio of 99/1 (solvent composition in Ex. 1) obtained in the above Production Example and components as identified in Table 1 as solvent (A) in a mass ratio as identified in Table 1. As 1233yd, an isomer mixture of 1233yd(Z) and 1233yd (E) in a mass ratio of 95/5 produced in accordance with the method disclosed in WO2017/018412 was used. As 1223yd, an isomer mixture of 1223yd(Z) and 1223yd(E) in a mass ratio of 95/5 produced in accordance with the method disclosed in GB709887 was used.

<Cleaning Property Test>

A test piece (25 mm×30 mm×2 mm) of stainless steel (SUS-304) was immersed in a cutting oil "Daphne Magplus LA5", tradename (manufactured by Idemitsu Kosan Co., Ltd.) and pulled up from the cutting oil to prepare a test piece having a cutting oil attached thereto. The immersion time until the test piece was dipped in 50 mL of each of the solvent compositions in Ex. 1 and 4 to 17 until the cutting oil attached to the test piece was completely removed was visually observed to evaluate the cleaning property. The results are shown in Table 1.

(Evaluation Standard)

SS: The cutting oil was removed in an immersion time of longer than 30 seconds and at most 45 seconds.

S: The cutting oil was removed within an immersion time of 30 seconds.

TABLE 1

| Ex. | 1437dycc Z/E ratio | Solvent (A) | Solvent composition [mass %] 1437dycc | Solvent (A) | Cleaning property |
|---|---|---|---|---|---|
| 1 | 99/1 | — | 100 | 0 | S |
| 4 | 99/1 | 2,2,4-Trimethylpentane | 75 | 25 | SS |
| 5 | 99/1 | Cyclohexane | 60 | 40 | SS |
| 6 | 99/1 | Isopropanol | 85 | 15 | SS |
| 7 | 99/1 | 1-Butanol | 90 | 10 | SS |
| 8 | 99/1 | 2-Methyl-1-propanol | 90 | 10 | SS |
| 9 | 99/1 | Trans-1,2-dichloro-ethylene | 80 | 20 | SS |
| 10 | 99/1 | Trans-1,2-dichloro-ethylene | 50 | 50 | SS |
| 11 | 99/1 | Methyl ethyl ketone | 60 | 40 | SS |
| 12 | 99/1 | Methyl isobutyl ketone | 75 | 25 | SS |
| 13 | 99/1 | Propylene glycol methyl ethyl acetate | 90 | 10 | SS |
| 14 | 99/1 | Ethyl acetate | 75 | 25 | SS |
| 15 | 99/1 | 1233yd(Z)/1233yd(E) = 95/5 | 50 | 50 | SS |
| 16 | 99/1 | 1233zd(Z) | 50 | 50 | SS |
| 17 | 99/1 | 1223yd(Z)/1223yd(E) = 95/5 | 50 | 50 | SS |

As shown in Table 1, it is found that the solvent compositions in Ex. 1 and 4 to 17 are excellent in cleaning property, with which the cutting oil can be sufficiently removed.

<Evaluation of Lubricant Solution>

To each of the solvent compositions in Ex. 1 and 4 to 17, each of silicone-based lubricants "Shin-Etsu Silicone KF-96-50CS", tradename (manufactured by Shin-Etsu Chemical Co., Ltd.) and "MDX4-4159", tradename (manufactured by Dow Corning Toray Co., Ltd.) was added in an amount of 3 mass % to the total amount of the solvent composition and the lubricant, whereupon the lubricants were uniformly dissolved.

Further, to the surface of a SUS-304 plate (25 mm×30 mm×2 mm), the above-obtained lubricant solution was applied and air-dried at from 19 to 21° C. to form a lubricant coating film on the SUS-304 surface. In each of Examples in which the solvent compositions in Ex. 1 to 15 were used as the coating solvent, a coating film of each of the silicone-based lubricants was uniformly formed as visually evaluated.

<Evaluation of Surface Treating Agent Solution to Impart Antifouling Property>

(Solubility)

To the solvent composition in Ex. 1, a surface treatment agent to impart antifouling property, tradename "Afluid S-550" (manufactured by Asahi Glass Company, Limited) was added in an amount of 5 mass % to the total amount of the solvent composition and the surface treatment agent, whereupon it was uniformly dissolved.

(Evaluation of Antifouling Property of Glass Plate Having Surface Treatment Agent Applied Thereto)

The above-described Afluid S-550 was mixed with the solvent composition in Ex. 1 at a concentration of 0.1 mass % to the total amount of the solvent composition and the surface treatment agent to obtain a surface treatment agent solution containing Afluid S-550.

A glass plate of 20 mm×30 mm×2 mm in thickness having water and n-hexadecane contact angles of less than 5°, was immersed in the surface treatment agent solution and pulled up at a rate 5 mm per second and dried to form an antifouling layer on the glass plate surface.

Then, the glass plate was left at rest at room temperature for 24 hours, whereupon the water contact angle of the antifouling layer on the glass plate surface was measured and found to be at least 112°. Further, the n-hexadecane contact angle of the antifouling layer on the glass plate surface after left at rest at room temperature for 24 hours was measured and found to be at least 68°. The water and n-hexadecane contact angles of the antifouling layer were measured by contact angle measuring apparatus DM-500 (manufactured by Kyowa Interface Science Co., Ltd.). Measurement was conducted at five different points on the surface of the antifouling layer, and the average value was calculated. For the calculated of the contact angle, a 26 method was employed. When the layer has a water contact angle of at least 100° and a n-hexadecane contact angle of at least 60°, practically it is considered to have a sufficient antifouling property.

Ex. 18 to 44

<Preparation of Solvent Composition>

Solvent compositions in Ex. 18 to 44 were prepared using the isomer mixture of 1437dycc(Z)/1437dycc(E) in a ratio of 99/1 (solvent composition in Ex. 1), the isomer mixture of 1437dycc(Z)/1437dycc(E) in a ratio of 95/5 (solvent composition in Ex. 2) or the isomer mixture of 1437dycc(Z)/1437dycc(E) in a ratio of 75/25 (solvent composition in Ex. 3) obtained in the above Production Example, and a stabilizer or solvent (A) which functions as a stabilizer in mass ratios as identified in Table 2. In Table 2, "BHT" means 2,6-di-tert-butyl-4-methylphenol.

<Stability Test>

The solvent compositions in Ex. 1 to 3 and 18 to 44 were subjected to a test to confirm the stability, in accordance with accelerated oxidation test in JIS K1508-1982. The results are shown in Table 2.

Into a 200 mL two-necked flask, 150 mL of each of the solvent compositions in Ex. 1 to 3 and 18 to 44 was put, and while oxygen bubbles saturated with moisture were made to flow in a state where a test piece of a cold-rolled steel plate coexisted in each of the vapor phase and the liquid phase of the solvent composition, light was applied from a bulb to conduct reflux by the heat generation of the bulb. The reflux time was 96 hours.

The outer appearance of the test piece after the test was compared with the out appearance before the test and evaluated based on the following evaluation standards. The results are shown in Table 2.

(Evaluation Standard for Test Piece Outer Appearance)

S (excellent): No change before and after the test
A (good): Gloss slightly lost, but practically no problem

TABLE 2

| Ex. | 1437dycc Z/E ratio | Stabilizer/ solvent (A) | Proportion of content of stabilizer/ solvent (A) [mass %] | Outer appearance of test piece after test In vapor phase | In liquid phase |
|---|---|---|---|---|---|
| 1 | 99/1 | — | — | A | A |
| 2 | 95/5 | — | — | A | A |
| 3 | 75/25 | — | — | A | A |
| 18 | 99/1 | 4-Methoxyphenol | 0.00005 | A | S |
| 19 | 99/1 | 4-Methoxyphenol | 0.0001 | A | S |
| 20 | 99/1 | 2-Methyl-2-pentene | 0.01 | A | S |
| 21 | 99/1 | 2-Methyl-2-pentene | 0.1 | A | S |

TABLE 2-continued

| Ex. | 1437dycc Z/E ratio | Stabilizer/ solvent (A) | Proportion of content of stabilizer/ solvent (A) [mass %] | Outer appearance of test piece after test In vapor phase | Outer appearance of test piece after test In liquid phase |
|---|---|---|---|---|---|
| 22 | 99/1 | 2-Methyl-2-pentene | 1 | A | S |
| 23 | 99/1 | 2,4,4-Trimethyl-1-pentene | 1 | A | S |
| 24 | 99/1 | 2,4,4-Trimethyl-1-pentene | 5 | A | S |
| 25 | 99/1 | 2,4,4-Trimethyl-2-pentene | 1 | A | S |
| 26 | 99/1 | 2-Propyn-1-ol | 0.1 | A | S |
| 27 | 99/1 | 2-Propyn-1-ol | 1 | A | S |
| 28 | 99/1 | 2-Methyl-2-propanol | 1 | A | S |
| 29 | 99/1 | 1,2-Butylene oxide | 0.01 | A | S |
| 30 | 99/1 | 1,2-Butylene oxide | 1 | A | S |
| 31 | 99/1 | N-Methylpyrrole | 0.0001 | A | S |
| 32 | 99/1 | N-Methylpyrrole | 0.001 | A | S |
| 33 | 99/1 | N-Methylpyrrole | 0.01 | A | S |
| 34 | 99/1 | N-Methylpyrrole | 0.1 | A | S |
| 35 | 99/1 | N-Methylpyrrole | 1 | A | S |
| 36 | 99/1 | N-Methylpyrrole | 5 | A | S |
| 37 | 99/1 | n-Heptane<br>BHT | 0.1<br>0.0001 | S | S |
| 38 | 99/1 | 2,4,4-Trimethyl-2-pentene<br>4-Methoxyphenol | 1<br>0.0001 | S | S |
| 39 | 99/1 | 2-Methyl-1-propanol<br>BHT | 0.1<br>0.0001 | S | S |
| 40 | 99/1 | 1,2-Butylene oxide<br>BHT | 1<br>0.0001 | S | S |
| 41 | 99/1 | N-Methylmorpholine<br>4-Methoxyphenol | 0.01<br>0.0001 | S | S |
| 42 | 95/5 | n-Heptane<br>BHT | 0.1<br>0.0001 | S | S |
| 43 | 75/25 | 2,4,4-Trimethyl-2-pentene<br>4-Methoxyphenol | 1<br>0.0001 | S | S |
| 44 | 75/25 | N-Methylpyrrole<br>4-Methoxyphenol | 0.01<br>0.0001 | S | S |

As shown in Table 2, it is found that the solvent composition of the present invention is more excellent in stability when it contains a stabilizer or solvent (A) which functions as a stabilizer.

INDUSTRIAL APPLICABILITY

The solvent composition of the present invention is a solvent composition which has no adverse effect on global environment and in which various organic substances are soluble. The solvent composition is useful for a wide range of industrial applications such as cleaning and coating, and can be used for substrates of various materials such as a metal, a resin and an elastomer without giving adverse effects.

This application is a continuation of PCT Application No. PCT/JP2018/031035, filed on Aug. 22, 2018, which is based upon and claims the benefit of priority from Japanese Patent Application No. 2017-162492 filed on Aug. 25, 2017. The contents of those applications are incorporated herein by reference in their entireties.

What is claimed is:

1. A method for producing a substrate with a coating film, comprising:
    dissolving a nonvolatile substance in a solvent composition comprising 1-chloro-2,3,3,4,4,5,5-heptafluoro-1-pentene, thereby obtaining a coating film-forming composition;
    applying the coating film-forming composition to a substrate; and
    evaporating the solvent composition, thereby forming a coating film containing the nonvolatile substance on the substrate,
    wherein in the 1-chloro-2,3,3,4,4,5,5-heptafluoro-1-pentene, a proportion of a content of (Z)-1-chloro-2,3,3,4,4,5,5-heptafluoro-1-pentene to a total amount of (Z)-1-chloro-2,3,3,4,4,5,5-heptafluoro-1-pentene and (E)-1-chloro-2,3,3,4,4,5,5-heptafluoro-1-pentene is at least 50 mass %, and
    in the solvent composition, a proportion of a content of 1-chloro-2,3,3,4,4,5,5-heptafluoro-1-pentene to a total amount of the solvent composition is at least 50 mass %.

2. The method according to claim 1,
    wherein in the 1-chloro-2,3,3,4,4,5,5-heptafluoro-1-pentene, the proportion of the content of (Z)-1-chloro-2,3,3,4,4,5,5-heptafluoro-1-pentene to the total amount of (Z)-1-chloro-2,3,3,4,4,5,5-heptafluoro-1-pentene and (E)-1-chloro-2,3,3,4,4,5,5-heptafluoro-1-pentene is at least 90 mass %.

3. The method according to claim 1, wherein in the solvent composition, the proportion of the content of 1-chloro-2,3,3,4,4,5,5-heptafluoro-1-pentene to the total amount of the solvent composition is from 50 mass % to 99.999 mass %.

4. The method according to claim 1, wherein in the 1-chloro-2,3,3,4,4,5,5-heptafluoro-1-pentene, the proportion of the content of (Z)-1-chloro-2,3,3,4,4,5,5-heptafluoro-1-pentene to the total amount of (Z)-1-chloro-2,3,3,4,4,5,5-heptafluoro-1-pentene and (E)-1-chloro-2,3,3,4,4,5,5-heptafluoro-1-pentene is at least 95 mass %.

5. The method according to claim 1, wherein the solvent composition further comprises
    a solvent soluble in 1-chloro-2,3,3,4,4,5,5-heptafluoro-1-pentene, and
    the solvent is at least one member selected from the group consisting of a hydrocarbon, an alcohol, a ketone, an ether, an ester, a chlorocarbon, a hydrofluorocarbon (HFC), a hydrofluoroether (HFE), a hydrochlorofluoroolefin (HCFO), a hydrofluoroolefin (HFO), and a chlorofluoroolefin (CFO).

6. The method according to claim 5, wherein the solvent is at least one member selected from the group consisting of isopropanol, 1-butanol, 2-methyl-1-propanol, 2,2,4-trimethylpentane, cyclohexane, methyl ethyl ketone, methyl isobutyl ketone, propylene glycol methyl ethyl acetate, ethyl acetate, trans-1,2-dichloroethylene, 1-chloro-2,3,3-trifluoro-1-propene, 1-chloro-3,3,3-trifluoro-1-propene and 1,3-dichloro-2,3,3-trifluoro-1-propene.

7. The method according to claim 1, wherein the solvent composition further comprises
    a stabilizer.

8. The method according to claim 7, wherein the stabilizer has a boiling point of from 80 to 120° C.

9. The method according to claim 1, wherein the nonvolatile substance is at least one member selected from the group consisting of a lubricant, an anticorrosive agent and a surface treatment agent.

10. The method according to claim 1, wherein in the 1-chloro-2,3,3,4,4,5,5-heptafluoro-1-pentene, the proportion of the content of (Z)-1-chloro-2,3,3,4,4,5,5-heptafluoro-1-pentene to the total amount of (Z)-1-chloro-2,3,3,4,4,5,5-heptafluoro-1-pentene and (E)-1-chloro-2,3,3,4,4,5,5-heptafluoro-1-pentene is at least 99 mass %.

11. The method according to claim 5, wherein the solvent is included in an amount of greater than 0 mass % and 1 mass % or less in the solvent composition.

12. The method according to claim 7,
wherein the stabilizer is at least one member selected from the group consisting of 1-propanol, isopropanol, 1-butanol, 2-butanol, 2-methyl-1-propanol, 2-methyl-2-propanol, 3-methyl-2-butanol, 2,2-dimethyl-1-propanol, 2-pentanol, 1-ethyl-1-propanol, allyl alcohol, 2-propyn-1-ol, 2,4,4-trimethyl-1-pentene, 2,4,4-trimethyl-2-pentene, n-heptane, 2,2,4-trimethylpentane, N-methylpyrrole and N-methylmorpholine, and
the stabilizer is included in an amount of greater than 0 mass % and 1 mass % or less in the solvent composition.

13. A solvent composition, comprising:
1-chloro-2,3,3,4,4,5,5-heptafluoro-1-pentene, in which a proportion of a content of (Z)-1-chloro-2,3,3,4,4,5,5-heptafluoro-1-pentene to a total amount of (Z)-1-chloro-2,3,3,4,4,5,5-heptafluoro-1-pentene and (E)-1-chloro-2,3,3,4,4,5,5-heptafluoro-1-pentene is at least 99 mass %; and
at least one solvent or stabilizer selected from the group consisting of 4-methoxyphenol, 2-methyl-2-pentene, 2,4,4-trimethyl-1-pentene, 2,4,4-trimethyl-2-pentene, 2-propyn-1-ol, 2-methyl-2-propanol, 1,2-butylene oxide, N-methylpyrrole, 2,6-di-tert-butyl-4-methylphenol, n-heptane, 2-methyl-1-propanol, 1,2-butylene oxide, and N-methylmorpholine,
wherein an amount of the solvent or stabilizer is greater than 0 mass % and 1 mass % or less.

14. The method according to claim 1, wherein the solvent composition further comprises
a surfactant in an amount of from 0.01 to 10 mass %.

15. The method according to claim 1, wherein the solvent composition further comprises
a lubricant comprising silicone, and
the lubricant is included in an amount of from 0.01 to 50 mass % in the solvent composition.

16. The method according to claim 1, wherein the solvent composition further comprises:
at least one first member selected from the group consisting of n-heptane, 2,4,4-trimethyl-2-pentene, 2-methyl-1-propanol, 1,2-butylene oxide, N-methylmorpholine, n-heptane, and N-methylpyrrole, in an amount of from 0.1 to 1 mass %; and
at least one second member selected from the group consisting of 2,6-di-tert-butyl-4-methylphenol and 4-methoxyphenol, in an amount smaller than an amount of the first member.

17. The method according to claim 16, wherein in the 1-chloro-2,3,3,4,4,5,5-heptafluoro-1-pentene, the proportion of the content of (Z)-1-chloro-2,3,3,4,4,5,5-heptafluoro-1-pentene to the total amount of (Z)-1-chloro-2,3,3,4,4,5,5-heptafluoro-1-pentene and (E)-1-chloro-2,3,3,4,4,5,5-heptafluoro-1-pentene is at least 75 mass %.

18. The method according to claim 1, wherein the solvent composition further comprises at least one solvent or stabilizer selected from the group consisting of 4-methoxyphenol, 2-methyl-2-pentene, 2,4,4-trimethyl-1-pentene, 2,4,4-trimethyl-2-pentene, 2-propyn-1-ol, 2-methyl-2-propanol, 1,2-butylene oxide, N-methylpyrrole, 2,6-di-tert-butyl-4-methylphenol, n-heptane, 2-methyl-1-propanol, 1,2-butylene oxide, and N-methylmorpholine.

19. The method according to claim 1,
wherein in the 1-chloro-2,3,3,4,4,5,5-heptafluoro-1-pentene, the proportion of the content of (Z)-1-chloro-2,3,3,4,4,5,5-heptafluoro-1-pentene to the total amount of (Z)-1-chloro-2,3,3,4,4,5,5-heptafluoro-1-pentene and (E)-1-chloro-2,3,3,4,4,5,5-heptafluoro-1-pentene is from 90 mass % to 95 mass %, and
the proportion of the content of 1-chloro-2,3,3,4,4,5,5-heptafluoro-1-pentene to the total amount of the solvent composition is from 90 mass % to 99.5 mass %.

20. The method according to claim 1, wherein the nonvolatile substance is an anticorrosive agent selected from the group consisting of a mineral oil, polyol ester, polyalkylene glycol, and polyvinyl ether.

* * * * *